(12) United States Patent
Dhanapal (10) Patent No.: US 8,848,540 B2
(45) Date of Patent: Sep. 30, 2014

(54) ESTIMATING MULTIMEDIA DATA PACKET BUFFERING TIME STREAMED OVER A SELECTED WIRELESS NETWORK

(75) Inventor: Karthikeyan Balaji Dhanapal, Bangalore (IN)

(73) Assignee: Infosys Limited (IN)

( * ) Notice: Subject to any disclaimer, the term of this patent is extended or adjusted under 35 U.S.C. 154(b) by 81 days.

(21) Appl. No.: 13/241,973

(22) Filed: Sep. 23, 2011

(65) Prior Publication Data

US 2013/0033988 A1 Feb. 7, 2013

(30) Foreign Application Priority Data

Aug. 2, 2011 (IN) ............................ 2646/CHE/2011

(51) Int. Cl.
| H04L 12/26 | (2006.01) |
| H04W 28/02 | (2009.01) |
| H04L 12/54 | (2013.01) |
| H04L 12/841 | (2013.01) |

(52) U.S. Cl.
CPC ....... *H04L 12/5692* (2013.01); *H04W 28/0236* (2013.01); *H04L 47/283* (2013.01); *H04L 43/08* (2013.01)
USPC .......................................... 370/241; 370/329

(58) Field of Classification Search
CPC ..... H04L 5/0053; H04L 63/062; H04L 63/08; H04L 63/0892; H04L 65/1089; H04L 65/4061; H04L 65/605; H04L 67/04; H04L 67/20; H04L 65/80; H04L 65/1006; H04L 65/1016; H04L 12/581; H04L 29/06197; H04L 29/06217; H04L 29/06353; H04L 29/06374; H04L 65/1083; H04L 65/1093; H04L 12/189; H04L 12/5895; H04L 29/06523; H04L 51/38
See application file for complete search history.

(56) References Cited

U.S. PATENT DOCUMENTS

| 7,224,677 B2* | 5/2007 | Krishnamurthi et al. ...... 370/331 |
| 8,259,592 B2* | 9/2012 | Rahman et al. ............... 370/242 |
| 2011/0083168 A1* | 4/2011 | Dutta et al. ........................ 726/4 |
| 2011/0161409 A1* | 6/2011 | Nair et al. ..................... 709/203 |

(Continued)

OTHER PUBLICATIONS

Saito, Y.; Hasegawa, M.; Murata, Y., "A Fast and Efficient End-to-End QOS Measurement Scheme for Real Seamless Handover," Personal, Indoor and Mobile Radio Communications, 2007. PIMRC 2007. IEEE 18th International Symposium on , vol., No., pp. 1,5, Sep. 3-7, 2007 doi: 10.1109/PIMRC.2007.4394439.*

(Continued)

*Primary Examiner* — Andrew Lai
*Assistant Examiner* — Hoyet H Andrews
(74) *Attorney, Agent, or Firm* — Lerner, David, Littenberg, Krumholz & Mentlik, LLP (57) ABSTRACT

A computer-implemented method for estimating buffering time of multimedia data packets for efficient playout of multimedia applications by a mobile device is provided. A wireless network with highest quality of service is selected from a plurality of wireless networks based on recorded information related to multimedia calls placed by the mobile device over the plurality of wireless networks. A multimedia call is placed over the selected wireless network for the mobile device and one or more conditions related to the selected wireless network and the mobile device is monitored. Information related to the one or more conditions of the selected wireless network and the mobile device are gathered. Based on the gathered information, buffering time of multimedia data packets is estimated. Before playout, multimedia data packets that are received by the mobile device are buffered for a predetermined time period corresponding to the estimated buffering time.

19 Claims, 4 Drawing Sheets

(56) References Cited

U.S. PATENT DOCUMENTS

| | | | | |
|---|---|---|---|---|
| 2011/0167104 | A1* | 7/2011 | Gupta et al. | 709/203 |
| 2011/0201336 | A1* | 8/2011 | Garrett et al. | 455/436 |
| 2012/0096520 | A1* | 4/2012 | Dutta et al. | 726/4 |
| 2012/0258708 | A1* | 10/2012 | Carter et al. | 455/427 |
| 2013/0107786 | A1* | 5/2013 | Lotfallah et al. | 370/312 |
| 2013/0137469 | A1* | 5/2013 | Schmidt et al. | 455/466 |
| 2013/0137472 | A1* | 5/2013 | Lohtia et al. | 455/466 |

OTHER PUBLICATIONS

Puttonen, J.; Fekete, G.; Vaaramaki, T.; Hamalainen, T., "Multiple Interface Management of Multihomed Mobile Hosts in Heterogeneous Wireless Environments," Networks, 2009. ICN '09. Eighth International Conference on , vol., No., pp. 324,331, Mar. 1-6, 2009 doi: 10.1109/ICN.2009.82.*

L. Atzori, F. Boi, and G. Nonnis, "IP telephony over mobile ad hoc networks: Joint routing and playout buffering," in Proceedings of the IEEE ICC, 2008, pp. 1861-1865.*

Atzori, L.; Boi, F.; Nonnis, G., "IP Telephony over Mobile Ad Hoc Networks: Joint Routing and Playout Buffering," Communications, 2008. ICC '08. IEEE International Conference on , vol., No., pp. 1861,1865, May 19-23, 2008, doi: 10.1109/ICC.2008.357.*

Saito, Y.; Hasegawa, M.; Murata, Y., "A Fast and Efficient End-to-End QOS Measurement Scheme for Real Seamless Handover," Personal, Indoor and Mobile Radio Communications, 2007. PIMRC 2007. IEEE 18th International Symposium on , vol., No., pp. 1,5, Sep. 3-7, 2007, doi: 10.1109/PIMRC.2007.4394439.*

Puttonen, J.; Fekete, G.; Vaaramaki, T.; Hamalainen, T., (Puttonen et al.), titled "Multiple Interface Management of Multihomed Mobile Hosts in Heterogeneous Wireless Environments," (Puttonen hereinafter) was prepared for Eighth International Conference on Networks, 2009. ICN '09., vol., No., pp. 324,331, Mar. 1-6, 2009, doi: 10.1109/ICN.2009.82.*

P. Calduwel Newton and Dr. L. Arockiam, (Newton et al.), titled "An Intelligent Technique to Improve Quality of Service (QoS) in Multihomed Mobile Networks," (Newton hereinafter) was presented in International Journal of Advanced Science and Technology, vol. 7, Jun. 2009, pp. 11-20.*

Sofiene Jelassi, Habib Youssef, (Jelassi et al.), titled "Adaptive playout scheduling algorithm tailored for real-time packet-based voice conversations over wireless ad-hoc networks," (Jelassi hereinafter) was prepared for Computer Networks, vol. 52, Issue 13, Sep. 17, 2008, pp. 2473-2488, ISSN 1389-1286, 10.1016/j.comnet.2008.04.009.*

* cited by examiner

ESTIMATING MULTIMEDIA DATA PACKET BUFFERING TIME STREAMED OVER A SELECTED WIRELESS NETWORK

FIELD OF THE INVENTION

The present invention relates generally to the field of playout of streaming multimedia applications over a wireless network and more particularly to a system and method that facilitates estimating buffering time of multimedia data packets streamed to a mobile device over a selected wireless network based on information obtained by adaptively monitoring conditions related to the selected wireless network and mobile device.

BACKGROUND OF THE INVENTION

Nowadays, packet based communication technology is widely used for streaming multimedia applications such as streaming video, streaming audio etc. In addition, transmission of multimedia applications over wireless networks is fast gaining popularity. Using various devices which are enabled for accessing the wireless networks, multimedia applications may be transmitted and received wirelessly. Examples of such devices include, but are not limited to, wireless enabled laptops, Personal Computers (PC's), Wireless Fidelity (WiFi) enabled handsets, Worldwide Interoperability for Microwave Access (WiMax) enabled handsets etc. Playout of high quality multimedia applications with minimal interruptions is of vital necessity to users of these mobile devices. Typically, interruptions are caused by delay in receiving the multimedia data packets by the mobile devices due to various unfavorable network conditions and mobile device conditions. To avoid such delays and in turn interruptions during playout, the multimedia applications in these devices buffer the received multimedia data packets artificially for a predetermined period of time before playing out the multimedia applications.

Conventionally, the multimedia applications determine the buffering time period based on past history of multimedia data packet delays in a particular wireless network. However, the wireless networks on which the packets are delivered to the devices are subjected to changing network conditions due to varying traffic in the network. Such changing network conditions contribute to delay time of multimedia packets and in turn the buffering time of multimedia packets. Therefore, past history information of packet delays may not aid in estimating the required buffering time of the multimedia applications efficiently. Further, in addition to changing wireless network conditions one or more factors specific to wireless networks exist that contribute to delay variation. These factors may depend on including, but not limited to, movement of the mobile devices from one coverage area to another coverage area transmission path of data packets in the coverage areas etc. The multimedia applications may not take into account such one or more factors that are specific to the wireless networks for estimating buffering time. Further, one or more mobile device conditions may exist during which the mobile devices are not in active mode to receive data packets. Such mobile device conditions may also cause interruptions when data packets are received and this may further contribute to the delay in packets. Existing multimedia applications do not take into account such device conditions while estimating buffering time of packets. Such delay variation induced by network and device conditions may lead to very high buffering time which may affect Quality of Service (QoS) of the multimedia applications. Therefore, user experienced quality of multimedia applications using internet protocol network may be impaired. In addition, QoS of a wireless network is not predetermined before streaming multimedia data packets to a mobile device.

In light of the above, there is a need for a system and method which facilitates selecting a wireless network based on QoS information and estimating buffering time of multimedia applications by adaptively monitoring varying network conditions of the selected wireless network. There is also a need for a system and method which facilitates estimating buffering time of multimedia applications by monitoring mobile device conditions. Also, there is a need for a system and method that records information related to VoIP calls placed over the wireless networks and using recorded information to select a wireless network for streaming multimedia applications to mobile device. Further, there is a need for a system and method that buffers packets received by multimedia applications in mobile devices over the selected wireless network before playout by using specific wireless network and device information. In addition, there is a need of a system and method that facilitates to estimate buffering time of multimedia data packets efficiently and result in an enhanced QoS of multimedia applications.

SUMMARY OF THE INVENTION

A computer-implemented method for estimating buffering time of multimedia data packets for efficient playout of multimedia applications by a mobile device is provided. In various embodiments of the present invention, the computer-implemented method comprises selecting a wireless network from a plurality of wireless networks based on Quality of Service (QoS) of the plurality of wireless networks. The wireless network with highest QoS is selected based on recorded information related to multimedia calls placed by the mobile device over the plurality of wireless networks. The method further comprises placing a multimedia call for the mobile device over the selected wireless network and monitoring one or more conditions related to the selected wireless network and the mobile device. The one or more conditions result in variation in delay of multimedia data packets streamed to the mobile device. Further, the method comprises gathering information related to the one or more conditions pertaining to the selected wireless network and the mobile device. Furthermore, the method comprises estimating buffering time of multimedia data packets based on the gathered information. The data packets corresponding to one or more multimedia applications that are received by the mobile device are buffered for a predetermined time period before playout. The predetermined time period corresponds to the estimated buffering time.

In an embodiment of the present invention, the multimedia calls comprise at least one of: Voice Over Internet Protocol (VoIP) calls and video conferencing. In another embodiment of the present invention, selecting a wireless network from a plurality of wireless networks based on Quality of Service (QoS) of the plurality of wireless networks comprises placing multimedia calls over each of the plurality of wireless networks via wireless network interfaces in the mobile device that correspond to each of the plurality of wireless networks. Further, the method comprises monitoring the multimedia calls placed over each of the plurality of wireless networks and obtaining one or more information related to the multimedia calls placed over each of the plurality of wireless networks. The one or more information comprises at least information related to quality of the multimedia calls placed over the plurality of wireless networks. Furthermore, the method comprises recording the obtained information and storing the recorded information in at least one of: memory within the mobile device, a central database in the operator's network, and in an external website. The method further comprises selecting the wireless network from amongst the plurality of wireless networks using the recorded information. The wireless network with highest QoS is selected.

In an embodiment of the present invention, the one or more information further comprises at least one of: time and date information related to the multimedia calls placed and location information of the mobile device when the multimedia calls are placed. In another embodiment of the present invention, the quality information related to the multimedia calls is obtained by at least one of: monitoring data packets related to the multimedia calls and capturing information related to delay in the transmission and reception of the data packets, calculating Mean Opinion Score (MOP) of ratings provided by multiple users on one or more parameters that deteriorate the quality of multimedia calls, and using Perceptual Speech Quality Measurement (PSQM) that provides measurement of speech intelligibility associated with the multimedia calls.

In an embodiment of the present invention, gathering information related to one or more conditions pertaining to the selected wireless network comprises sending a query to a wireless network interface in the mobile device that corresponds to the selected wireless network and monitoring the response to the query. The query response facilitates to determine the retransmission rate of the data packets over the selected wireless network. In another embodiment of the present invention, gathering information related to one or more conditions pertaining to the mobile device comprises sending a query to a wireless network interface in the mobile device that corresponds to the selected wireless network and obtaining time interval information related to at least one of: sleep mode, scan mode, and roaming mode of the mobile device. In yet another embodiment of the present invention, gathering information related to one or more conditions pertaining to the mobile device comprises sending a query to a wireless network interface in the mobile device and obtaining time interval information related to the period for which the mobile device is disconnected with the selected wireless network. In another embodiment of the present invention, gathering information related to one or more conditions pertaining to the mobile device and the selected wireless network comprises sending ping packets to an access point in the selected wireless network and processing the query response received from the access point.

In an embodiment of the present invention, estimating buffering time of multimedia data packets based on the gathered information comprises processing information related to one or more conditions of the selected wireless network and the mobile device. The information facilitates to determine the one or more conditions that result in variation in delay of transmission and reception of data packets related to the multimedia calls. Further, the method comprises estimating a predetermined time period for buffering multimedia data packets received by the mobile device before playout based on the processed information.

In another embodiment of the present invention, estimating a predetermined time period for buffering multimedia data packets received by the mobile device before playout comprises at least one of: determining a threshold in case of a retransmission condition of the selected wireless network. The buffering time is increased if the retransmission rate exceeds the predetermined threshold and buffering time is reduced if the retransmission rate is below the predetermined threshold. In yet another embodiment of the present invention, estimating a predetermined time period for buffering multimedia data packets received by the mobile device before playout comprises at least one of: ascertaining the time interval for which the mobile device is in any of sleep, scan and roaming mode as the buffering time for data packets and ascertaining the time interval for which the mobile device is disconnected with the selected wireless network.

In an embodiment of the present invention, the method further comprises receiving the estimated buffering time and playing multimedia data packets received by the mobile device after the estimated buffering time.

A system for estimating buffering time of multimedia data packets for efficient playout of multimedia applications by a mobile device is provided. In various embodiments of the present invention, the mobile device comprises multiple wireless network interfaces that facilitate the mobile device to communicate with multiple wireless networks. The system comprises a wireless network select module in communication with a processor and configured to select a wireless network from amongst the multiple wireless networks based on Quality of Service (QoS) of the multiple wireless networks. The wireless network with highest QoS is selected based on recorded information related to multimedia calls placed by the mobile device over the multiple wireless networks. The system further comprises a buffering module in communication with the processor and configured to estimate buffering time of multimedia data packets received by the mobile device over the selected wireless network. The estimation is performed based on information related to one or more conditions of the selected wireless network and the mobile device. The one or more conditions result in variation in delay of multimedia data packets streamed to the mobile device. The data packets correspond to one or more multimedia applications that are received by the mobile device and are buffered for a predetermined time period before playout. The predetermined time period corresponds to the estimated buffering time.

In an embodiment of the present invention, the wireless network select module comprises a record module. The record module is in communication with the processor and is configured to record one or more information related to multimedia calls placed over the multiple wireless networks. The one or more information comprises at least information related to quality of the multimedia calls and a decision module in communication with the processor and configured to facilitate selecting a wireless network with highest QoS based on the recorded information.

In another embodiment of the present invention, the buffering module comprises a state observer module. The state observer module is in communication with the processor and is configured to gather time interval information related to one or more conditions of the selected wireless network and the mobile device.

In another embodiment of the present invention, the buffering module comprises a buffering time estimating module. The buffering time estimating module is in communication with the processor and is configured to estimate buffering time of data packets related to multimedia data packets received over the selected wireless network based on the time interval information received from the state observer module.

In another embodiment of the present invention, the buffering module comprises a playout module. The playout module is in communication with the processor and is configured to play multimedia data packets received over the selected wireless network after a predetermined time period. The predetermined time period corresponds to the estimated buffering time received from the buffering time estimation module.

BRIEF DESCRIPTION OF THE DRAWINGS

The present invention is described by way of embodiments illustrated in the accompanying drawings wherein.

DETAILED DESCRIPTION

A system and method is provided that facilitates estimating buffering time of multimedia data packets received using Internet Protocol (IP) network based on information from a selected wireless network and mobile device. The invention facilitates adaptive gathering of one or more factors which are specific to the wireless network with which the mobile device is communicating for transmission and reception of multimedia data packets. The invention further facilitates adaptive gathering of information related to the mobile device state. Furthermore, the invention facilitates recording multimedia calls such as VoIP calls and video conferencing placed over one or more wireless networks and storing the recorded information. The recorded information is later used to select a wireless network which has better QoS as compared with other wireless networks. Buffering time of multimedia data packets are calculated by adaptively monitoring the selected wireless network conditions and conditions of the mobile device communicating with the selected wireless network.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
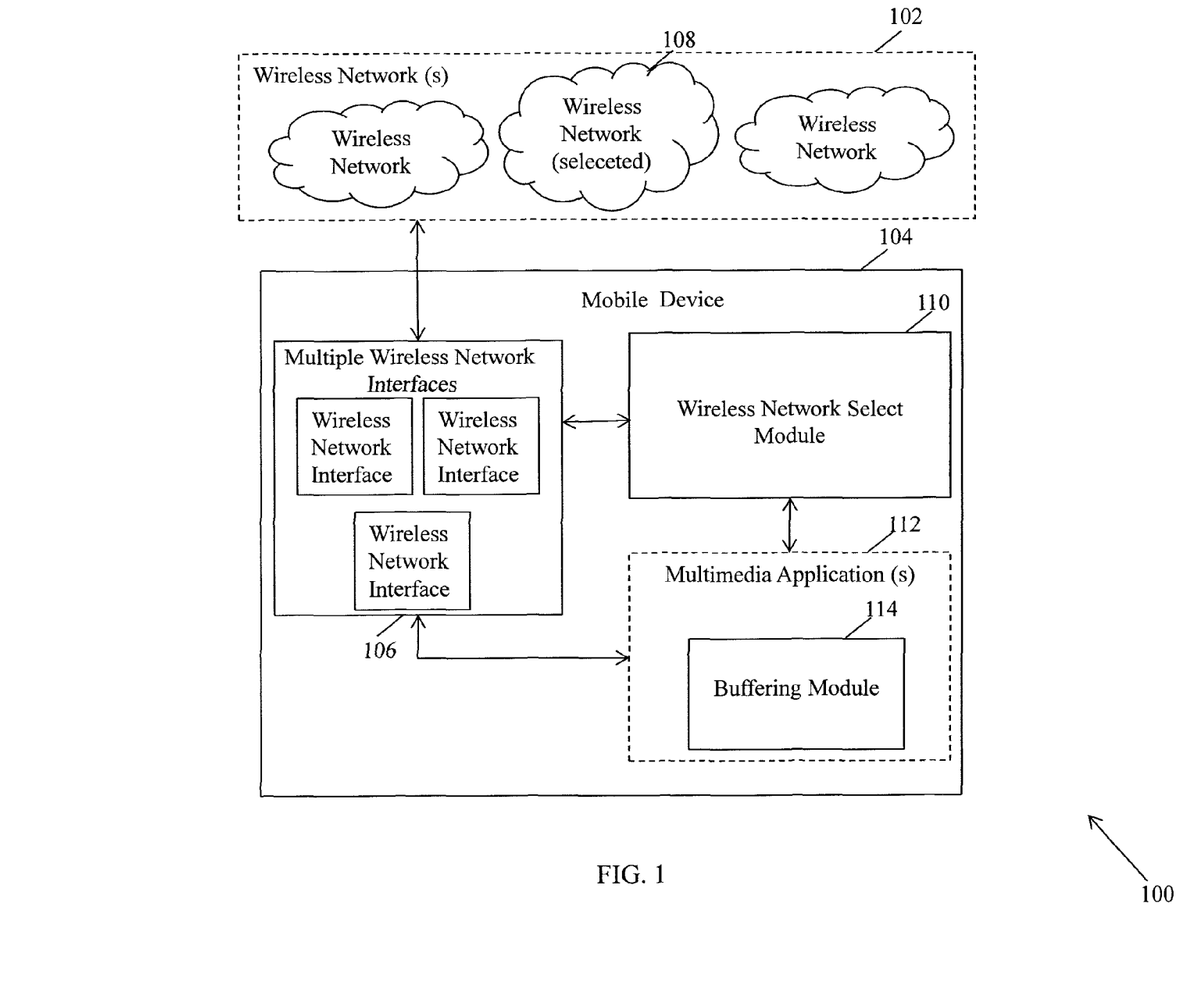
FIG. 1 is a block diagram of a system in which various embodiments of the present invention are embodied for facilitating estimation of buffering time of multimedia data packets streamed over a selected wireless network, in accordance with an embodiment of the present invention.

FIG. 1 is a block diagram of a system 100 in which various embodiments of the present invention are embodied for facilitating estimation of buffering time of multimedia data packets streamed over a selected wireless network, in accordance with an embodiment of the present invention.

In various embodiments of the present invention, wireless network 102 is a communication network over which one or more mobile devices 104 communicate using one or more wireless technologies. As shown in FIG. 1, the wireless network 102 includes multiple wireless networks. Examples of wireless networks include, but are not limited to, cellular wireless telephony systems, Wireless Local Area Network (WLAN), Wireless Personal Area Network (WPAN), Wireless Metropolitan Area Network (WMAN), Internet Protocol (IP) Multimedia Subsystem (IMS). The mobile devices 104 include multiple wireless network interfaces 106 using which users communicate over multiple wireless networks 102. For example, the multiple wireless network interfaces 106 may include IEEE 802.11 wireless network interfaces (e.g. WiFi, WLAN interface), a 3G/4G wireless interface, a WiMax interface, etc. Using the multiple wireless interfaces 106, the mobile device 104 may communicate via a WLAN device, a 3G device, 4 G device etc. Examples of mobile device 104 include, but are not limited to, mobile handsets, wireless enabled laptops, Personal Computers (PC's) etc.

In an embodiment of the present invention, the mobile device 104 facilitates playout of one or more multimedia applications 112 for user of the mobile device 104. Multimedia applications 112 are a combination of any one of text, audio, still images, animation, and video and are transmitted and received by the mobile device 104 over any of the wireless networks 102. Examples of multimedia applications 112 include, but are not limited to, gaming applications, video-conferencing applications, movies using multimedia features, multimedia learning applications, Video on Demand (VOD) applications, video streaming and audio streaming Quality of Service (QoS) of a wireless network 102 is a vital parameter for determining quality of playout of one or more multimedia applications 112 and in turn providing a rich experience to user of the one or more multimedia applications 112.

As shown in FIG. 1, multiple wireless networks 102 exist which may provide varied QoS. In an embodiment of the present invention, before streaming multimedia data packets for playout by a mobile device 104, wireless network with preferred QoS is selected (represented as selected wireless network 108) for streaming of multimedia data packets. Further, multimedia data packets received over the selected wireless network 108 are buffered for a predetermined period of time before playout. In an embodiment of the present invention, the mobile device 104 comprises a wireless network select module 110 for selecting a wireless network and a buffering module 114 for estimating predetermined time period for buffering of multimedia data packets.

In an embodiment of the present invention, the wireless network select module 110 is a software module which facilitates selecting a wireless network from multiple wireless networks 102 over which multimedia calls are placed by the mobile device 104. In an embodiment of the present invention, multimedia calls are initiated by the multimedia applications 112 in the mobile device 104 and the multimedia calls are placed over each of the wireless networks 102 via corresponding wireless network interfaces 106. The multimedia calls placed over the wireless networks 102 are then monitored by the wireless network select module 110 via the corresponding wireless network interfaces 106. The wireless network select module 110 further records one or more information related to the multimedia calls. Using the recorded information, the wireless network select module 110 facilitates to select a wireless network from amongst the wireless networks 102 to route a multimedia call and transmit multimedia data packets to the mobile device 104. The wireless network select module 110 selects the wireless network with high QoS based on the recorded information, which is shown as selected wireless network 108 in FIG. 1. For example, quality of multimedia calls placed from a particular location of the mobile device 104 can be determined based on the recorded information of each wireless network 102 i.e. WLAN, IMS or cellular network. Alongwith quality, the cost of service can also be determined. The selected wireless network 108 may include the network with highest QoS and lowest cost. Using the selected wireless network 108, multimedia data packets are streamed to or from the mobile device 104 via the corresponding wireless network interface 106. Each multimedia application 112 in the mobile device 104 comprises a buffering module 114.

In an embodiment of the present invention, the buffering module 114 is a software module configured to adaptively monitor the condition of the selected wireless network 108 and the mobile device 104 which contributes to delay in the transmission and reception of the multimedia data packets. In an exemplary embodiment of the present invention, the conditions in the selected wireless network 108 which may cause delay variations in transmission of multimedia packets may include retransmission of the data packets due to poor channel conditions. Retransmissions may occur due to spatial and temporal variations of radio conditions of the selected wireless network 108. In another exemplary embodiment of the present invention, mobile device 104 may contribute to delay variations when it enters into a mode in which the mobile device 104 experiences interruptions while receiving data packets from the selected wireless network 108. In an exemplary embodiment of the present invention, the mobile device 104 may enter into sleep mode whenever the mobile device 104 operates in low power mode. In this mode the mobile device 104 does not receive data packets. The mobile device 104 may receive packets only when it wakes up periodically during the wake up time. In another exemplary embodiment of the present invention, the mobile device 104 may be disconnected with the selected wireless network 108 due to lack of network coverage. In another exemplary embodiment of the present invention, the mobile device 104 may be disconnected from the selected wireless network 108 when it scans for new networks. In yet another exemplary embodiment of the present invention, the mobile device 104 may be disconnected from the selected wireless network 108 when the user of the mobile device 104 roams from one coverage area to another coverage area. Based on the information obtained from the conditions of the selected wireless network 108 and mobile device 104, the buffering module 114 estimates buffering time of the multimedia data packets received over the selected wireless network 108. The buffering module 114 facilitates playout of the multimedia data packets after a predetermined time period which is the estimated buffering time. In various embodiments of the present invention, the multimedia application 112 that takes into account delay variations of a wireless network that is preselected based on QoS (represented as selected wireless network 108) and delay variations contributed by mobile device 302, can perform efficient packet buffering which in turn provides improvement in user experience.

Figure 2:
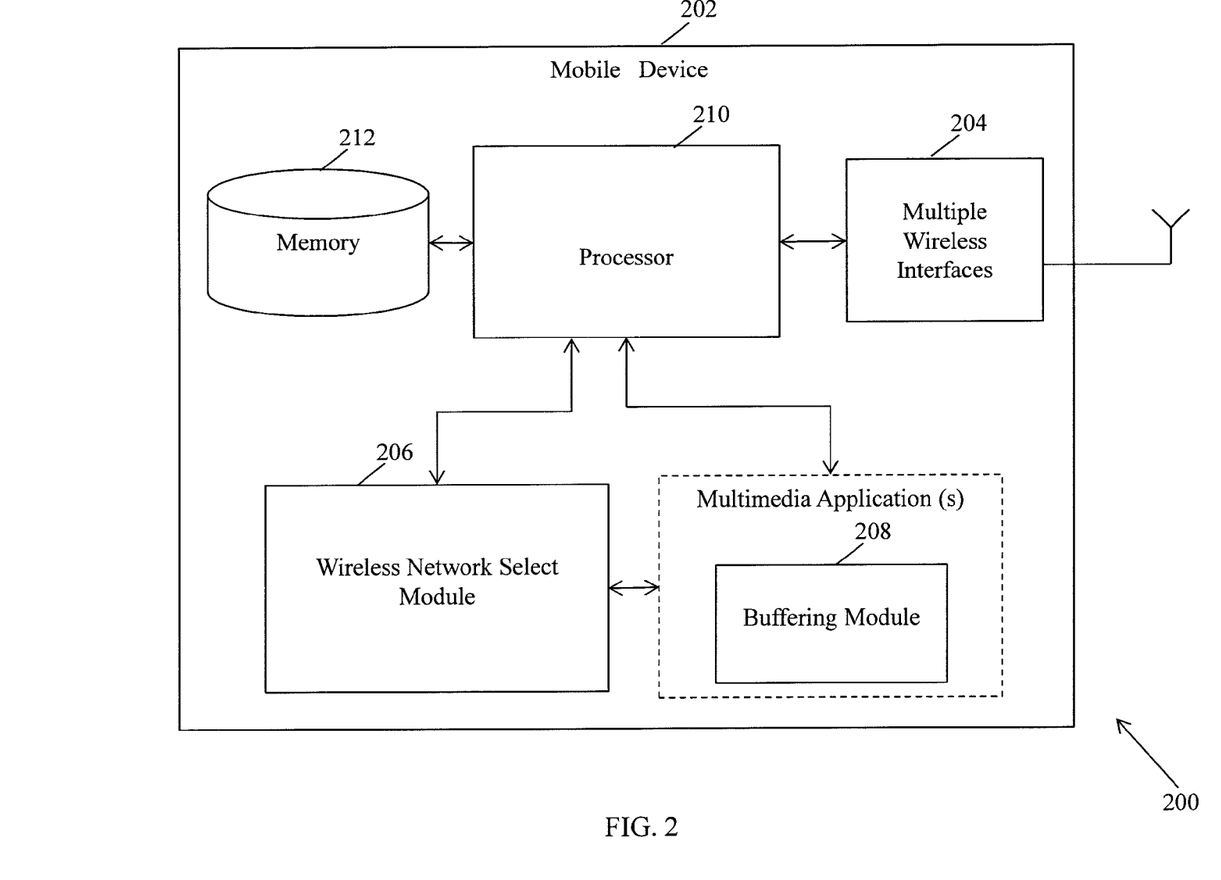
FIG. 2 illustrates a basic block diagram of a mobile device which facilitates to execute the functionalities of various embodiments of the present invention.

FIG. 2 illustrates an exemplary block diagram of a mobile device which facilitates to execute the functionalities of various embodiments of the present invention.

As shown in FIG. 2, multiple wireless network interfaces 204, wireless network select module 206 and buffering module 208 within the exemplary mobile device 202 operate in communication with a processor 210 and a memory 212.

The multiple wireless network interfaces 204 are controlled by the mobile device's 202 driver (software) (not shown) which is executed by the processor 210 for enabling the mobile device 202 to send and receive multimedia data packets over multiple wireless networks. Further, the processor 210 executes a set of program instructions of the wireless network select module 206 for selecting a wireless network with highest QoS from amongst multiple wireless networks. The processor 210 further executes a set of program instructions of the buffering module 208 for estimating predetermined time period for buffering of multimedia data packets received over the selected wireless network. Data related to the wireless network select module 206 and the buffering module 208 are stored in the memory 212 within the mobile device 202.

Figure 3:
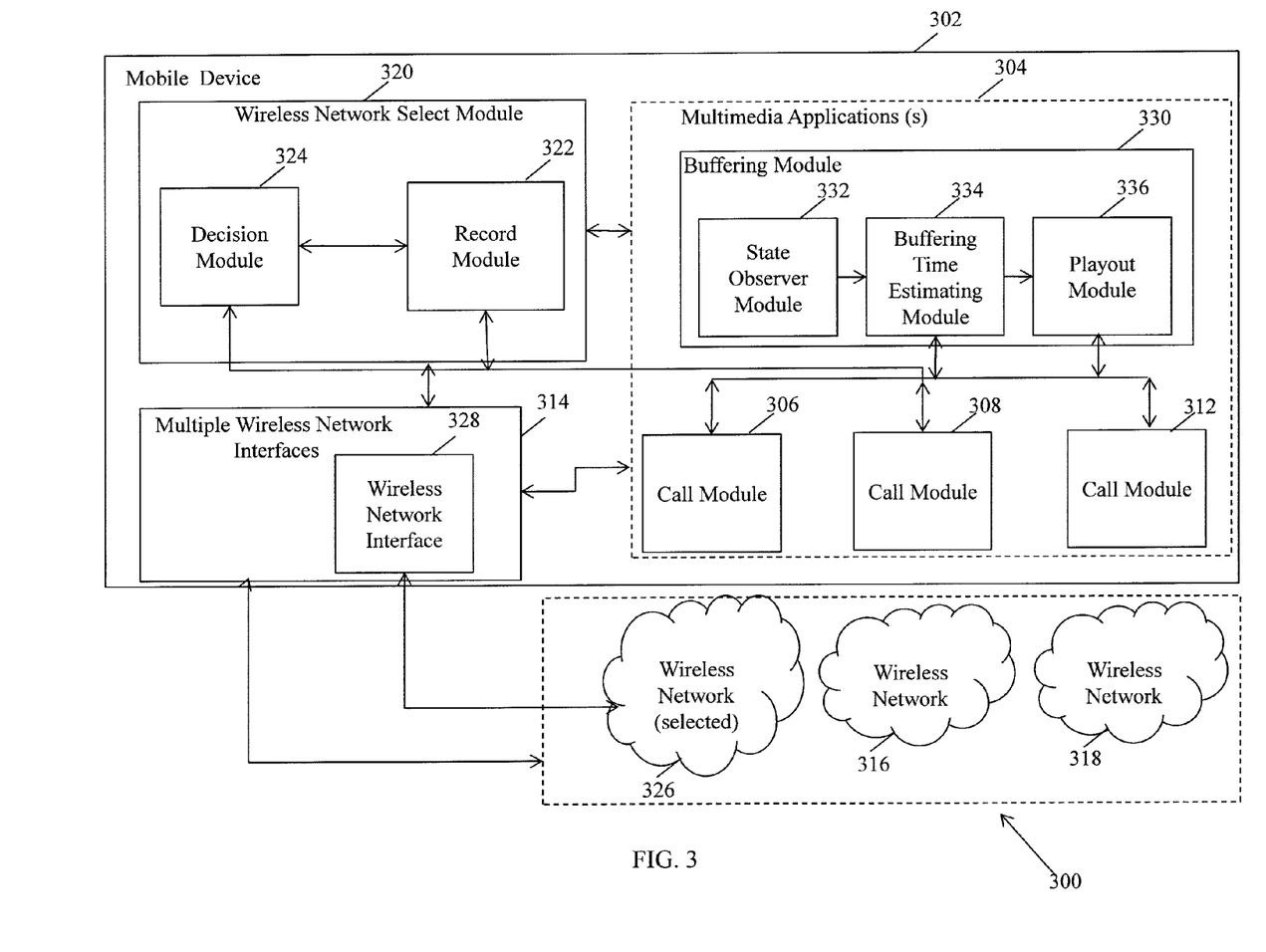
FIG. 3 is a detailed block diagram of a system that facilitates estimating buffering time of multimedia data packets streamed over a selected wireless network, in accordance with an embodiment of the present invention.

FIG. 3 is a detailed block diagram of a system that facilitates estimating buffering time of multimedia data packets streamed over a selected wireless network, in accordance with an embodiment of the present invention.

In various embodiments of the present invention, the mobile device 302 facilitates play out of multimedia applications 304 for user of the mobile device 302. The multimedia applications 304 comprise one or more call modules 306, 308, 312. The one or more call modules 306, 308, 312 initiate multimedia calls which are placed over the wireless networks 316, 318, 326 via corresponding wireless network interfaces 314. The wireless networks 316, 318, 326 may include, but are not limited to, WLAN, IMS network and cellular network. The mobile device 302 further comprises a wireless network select module 320 which includes a record module 322 and a decision module 324. As shown in FIG. 3, the wireless network select module 320 facilitates selection of a wireless network (represented as selected wireless network 326) over which multimedia data packets are streamed to the mobile device 302 for playout. The multimedia data packets are streamed to the mobile device 302 via a wireless network interface 328 that corresponds to the selected wireless network 326.

The one or more call modules 306, 308 and 312 are software modules which facilitate initiation and termination of multimedia calls over the corresponding wireless networks 316, 318, 326. In an embodiment of the present invention, the call modules 306, 308, 312 initiates VoIP calls over the one or more wireless networks 316, 318, 326 and facilitates the record module 322 and the decision module 324 to receive one or more information related to the VoIP calls placed over the wireless networks 316, 318, 326 respectively.

Record module 322 is a software module which is configured to facilitate the wireless network select module 320 to receive one or more quality related information of the VoIP calls from the call modules 306, 308, 312 and record the one or more information related to the calls placed. In an exemplary embodiment of the present invention, time and date information related to the wireless networks 316, 318, 326 which are used to place the VoIP calls is recorded. For example, if the VoIP call is placed over a WLAN network using a Wi-Fi enabled mobile device 302, time and date information related to the WLAN network is recorded. In another example, if the VoIP call is placed over a 4G-IMS network using a WiMax enabled mobile device 302, time and date information related to the IMS network is recorded. In another exemplary embodiment of the present invention, information pertaining to quality of VoIP calls placed over any of the wireless networks 316, 318, 326 is recorded. For example, information related to quality of calls may be captured by monitoring VoIP packets and estimating the delay between transmission and reception of the VoIP packets. The delay in the transmission and reception of VoIP packets may be due to wireless network conditions that cause propagation delay, serialization delay, packet forwarding delay, queuing delay, packetization or depacketization delay etc. In addition, delay may also result due to state of the mobile device 302, connectivity issues between the mobile device 302 and any of wireless network 316, 318, 326 etc. In another example, quality related information of VoIP calls may be captured based on inputs received from user of the mobile device 302 using Mean Opinion Score (MOS) where a mean opinion score of ratings provided by different users on echo, noise, delay, distortion of the calls is calculated. In another example, quality related information of VoIP calls may be captured using Perceptual Speech Quality Measurement (PSQM) that uses artificial speech and provides numeric values of approximate speech intelligibility taking into account factors such as noise, coding errors, packet reordering, jitter etc. In an exemplary embodiment of the present invention, location information of the mobile device 302 communicating with any of wireless networks 316, 318, 326 is periodically located using information from Global Positioning Systems (GPS) present in the mobile device 302.

In an embodiment of the present invention, the recorded information related to any of the wireless networks 316, 318, 326 is stored in a central database (not shown). In another embodiment of the present invention, the recorded information related to any of the wireless networks 316, 318, 326 is uploaded to an external website (not shown). In yet another embodiment of the present invention, the recorded information related to any of the wireless networks 316, 318, 326 is stored in the memory of the mobile device 302.

Decision module 324 is a software module which facilitates the wireless network select module 320 to take decision on selection of wireless network using recorded information related to quality of calls placed in the one or more wireless networks 326, 316 and 318. In an embodiment of the present invention, when multiple wireless networks 326, 316 and 318 are available for placing multimedia calls by the mobile device 302, the decision module 324 obtains quality related information corresponding to the wireless networks 326, 316 and 318 from the record module 322 to select a wireless network. For example, QoS information of WLAN, IMS or cellular network may be used to select the wireless network which has high quality as compared to the other networks and is also cost effective. QoS information of the selected wireless network from a particular location of the mobile device 302 facilitates to determine the quality of the call which the user of the mobile device 302 is likely to receive. As shown in FIG. 3, wireless network 326 is represented as the selected wireless network and is used to place a VoIP call for the mobile device 302.

In an embodiment of the present invention, the decision module 324 signals the record module 322 with information related to the selected wireless network 326. The record module 322 initiates recording of one or more information of the VoIP call by signaling the call module that corresponds to the selected wireless network 326. Once the call is over, the record module 322 stops recording and stores the recorded information.

In an embodiment of the present invention, the selected wireless network 326 is used to transmit multimedia data packets to the mobile device 302. The mobile device 302 comprises multimedia applications 304 which facilitate the mobile device 302 to receive and buffer the multimedia data packets for a predetermined time period before playout of the multimedia application. Each multimedia application comprises a buffering module 330. In an embodiment of the present invention, the buffering module 330 is a software module which is configured to estimate the predetermined time period for buffering the multimedia data packets received by the mobile device 302 over the selected wireless network 326. The predetermined time period is the buffering time. In various embodiments of the present invention, the buffering module 330 comprises a state observer module 332, a buffering time estimating module 334 and a playout module 336.

In an embodiment of the present invention, the state observer module 332 is a software module which is configured to gather information related to condition of the selected wireless network 326, and condition of the mobile device 302 by querying the wireless network interface 328 and monitoring the VoIP data packets. The conditions of the selected wireless network 326 and mobile device 302 vary from time to time and in turn contribute to delay variation of multimedia data packets streamed to the mobile device 302. In an exemplary embodiment of the present invention, the state observer module 332 adaptively monitors the condition of the selected wireless network 326 by periodically querying the wireless network interface 328 in the mobile device 302 that corresponds to the selected wireless network 326. The response of the wireless network interface 328 to the query is monitored to identify if any retransmission of data packets have occurred due to poor channel conditions of the selected wireless network 326. The state observer module 332 then stores information related to the number of retransmissions that have occurred per unit of time. A high retransmission rate indicates poor wireless channel conditions and a low retransmission rate indicates good wireless channel condition. In another exemplary embodiment of the present invention, the state observer module 332 may send ping packets to an access point or any other node in the selected wireless network 326 to obtain information related to rate of such retransmissions.

In another exemplary embodiment of the present invention, the mobile device 302 may receive a response to the query from the wireless network interface 328 when the mobile device 302 is disconnected from the selected wireless network 326. Such a query response facilitates to determine that there is loss of connectivity between the mobile device 302 and the selected wireless network 326. Loss of connectivity between the mobile device 302 and the selected wireless network 326 may occur when the mobile device 302 moves to an area which is out of coverage of the selected wireless network 326. Past history information related to the time period for which the mobile device 302 moves to an out of coverage area is also determined. Based on current and past history information, the time interval for which the mobile device 302 moves into an out of coverage area is determined.

In another embodiment of the present invention, the state observer module 332 adaptively monitors the condition of the mobile device 302 by querying the wireless network interface 328 in the mobile device 302. In particular, the state observer module 332 queries mobile device's 302 driver (not shown) for obtaining information related to the various modes of the mobile device 302. The mobile device's 302 driver (not shown) controls the wireless network interface 328 via which the mobile device 302 communicates with the selected wireless network 326.

In an exemplary embodiment of the present invention, the state observer module 332 determines the time interval for which the mobile device 302 enters into sleep mode due to low power availability by querying the wireless network interface 328 in the mobile device 302. In another exemplary embodiment of the present invention, the state observer module 332 determines the time interval for which the mobile device 302 enters into scan mode and scans for new wireless networks. The state observer module 332 may obtain dwell time of the mobile device 302 and obtain the time interval of the scan mode by multiplying dwell time in each channel of the selected wireless network 326 with the number of channels of the selected wireless network 326. In yet another exemplary embodiment of the present invention, the state observer module 332 determines the time period for which the mobile device 302 roams into a new coverage area. Past history information related to the time period for which the mobile device 302 roams into a new coverage area is also determined Based on current and past history information, the time interval for which the mobile device 302 roams into a new coverage area is determined.

In an embodiment of the present invention, the state observer module 332 sends the information obtained by adaptively monitoring the selected wireless network 326 and the mobile device 302 to the buffering time estimating module 334. The buffering time estimating module 334 is a software module which is configured to estimate the buffering time for multimedia data packets based on the received information related to the selected wireless network 326 and the mobile device 302 conditions respectively.

In an exemplary embodiment of the present invention, the information may include time interval information obtained by adaptively monitoring the mobile device 302. Time interval information indicates the duration for which the various conditions that contribute to delay variations in the reception of multimedia packets persist for the mobile device 302. The buffering time estimating module 334 is a software module which is configured to estimate the buffering time for multimedia data packets based on the time interval information related to the VoIP data packets. In an exemplary embodiment of the present invention, the time spent by the mobile device 322 in sleep mode may be considered as the buffering time for received packets that have dependencies on packets that may be received after sleep mode. In another exemplary embodiment of the present invention, the time spent by the mobile device 322 in scan mode may be considered as the buffering time. In yet another exemplary embodiment of the present invention, time interval information represents the time period for which the mobile device 302 is disconnected with the selected wireless network 326.

In another exemplary embodiment of the present invention, the information may include rate of retransmission of data packets in the selected wireless network 326 which is obtained by adaptively monitoring the selected wireless network 326. In case of such retransmission conditions, buffering time may be estimated by determining a threshold. For example, if retransmission rate exceeds the predetermined threshold, the buffering time may be increased. If retransmission rate is below the threshold, the buffering time may be reduced.

In an embodiment of the present invention, the buffering time estimating module 334 sends the estimated buffering time to the playout module 336. The play out module 336 is a software module configured to receive the multimedia data packets from lower layers of the selected wireless network 326 via the TCP/IP or UDP protocols. The playout module 336 plays out the multimedia data packets that are received after buffering the data packets for a predetermined time period. The predetermined time period is the buffering time as estimated by the buffering time estimating module 334. In an embodiment of the present invention, the playout module 336 plays out the buffered packets such that when the last buffered packet is played, the mobile device 302 starts receiving multimedia data packets from the selected wireless network 326.

Figure 4:
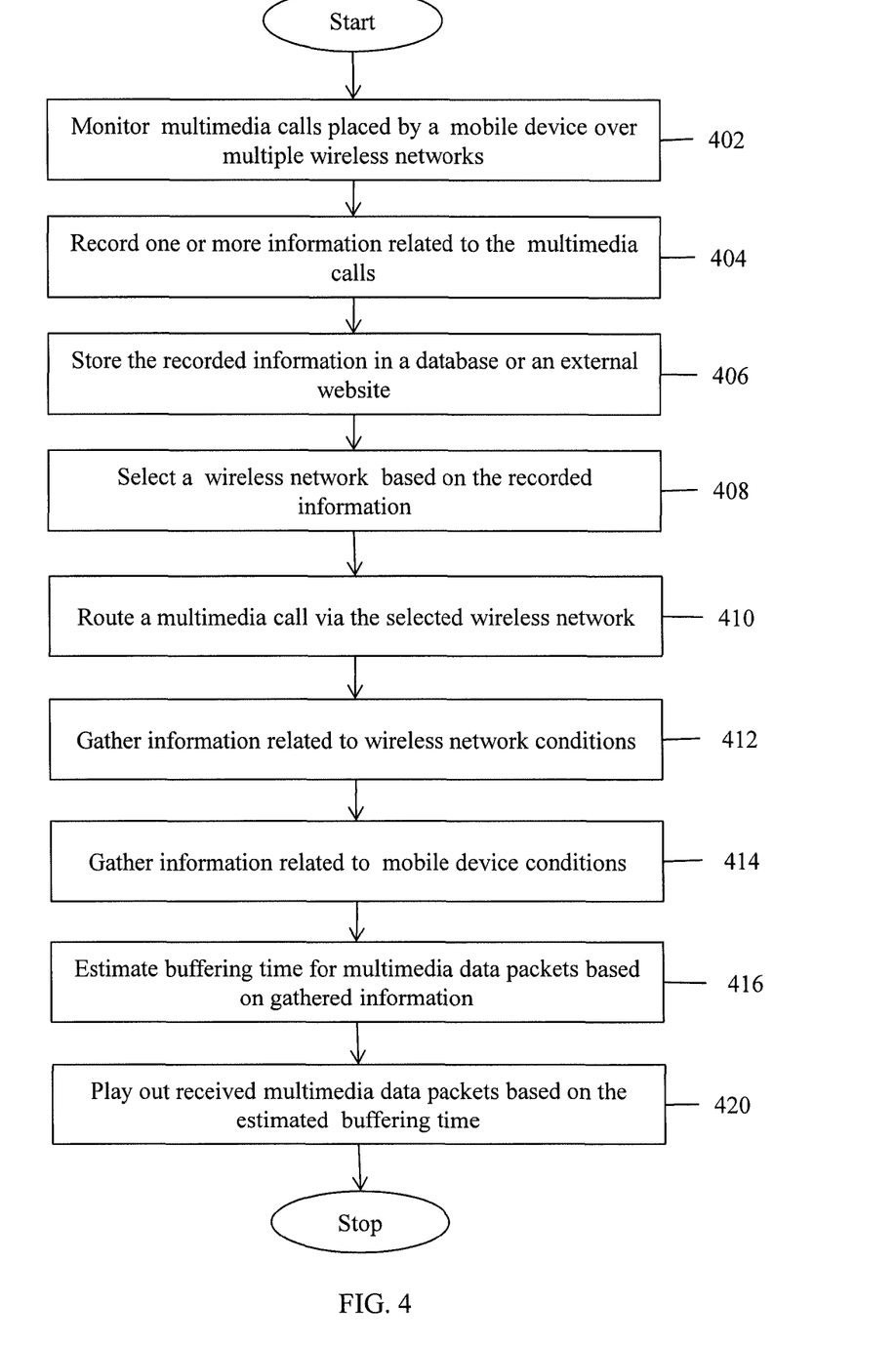
FIG. 4 illustrates a flowchart of a method that facilitates estimating buffering time of multimedia data packets streamed over a selected wireless network, in accordance with an embodiment of the present invention.

FIG. 4 illustrates a flowchart of a method that facilitates estimating buffering time of multimedia data packets streamed over a selected wireless network, in accordance with an embodiment of the present invention.

At step 402, multimedia calls placed by a mobile device over multiple wireless networks is monitored. In an embodiment of the present invention, VoIP calls placed by the mobile device over multiple wireless networks are monitored. Examples of wireless network include, but are not limited to, WLAN, IMS and cellular network.

At step 404, one or more information related to the multimedia calls are recorded. In an embodiment of the present invention, one or more information related to the QoS provided by the one or more wireless networks is recorded. In another embodiment of the present invention, location information of the mobile device is recorded. In yet another embodiment of the present invention, time and date information related to VoIP call placed on different wireless networks is recorded.

At step 406, the recorded information is stored. In an embodiment of the present invention, the recorded information is stored in a memory within the mobile device. In another embodiment of the present invention, the recorded information is stored in a central database which is within operator's network or outside the operator's network. In yet another embodiment of the present invention, the recorded information is uploaded in an external website.

At step 408, a wireless network based on the recorded information is selected. In an embodiment of the present invention, based on the recorded information related to QoS of the one or more wireless networks, the wireless network with high QoS and low cost may be selected for streaming wireless multimedia applications to the mobile device.

At step 410, a multimedia call is routed via the selected wireless network. In an embodiment of the present invention, VoIP data packets are routed via the selected wireless network and the mobile device receives the VoIP data packets via the selected wireless network. In an exemplary embodiment of the present invention, the mobile device connects to the selected wireless network through process of discovery and association as defined in 802.11 standards. In another exemplary embodiment of the present invention, the mobile device acquires Internet Protocol (IP) address from an access point in the selected wireless network. In yet another exemplary embodiment of the present invention, the mobile device sends one or more credentials to the access point for authorization of the mobile device. After authorization, the initialization is completed for sending and receiving the VoIP call.

At step 412, information related to the selected wireless network condition is gathered. In an embodiment of the present invention, a query is sent to wireless network interface in the mobile device to gather information related to the selected wireless network. In another exemplary embodiment of the present invention, a query may be sent to the wireless network interface for detecting retransmission rate of data packets in the selected wireless network due to poor channel conditions.

At step 414, information related to mobile device conditions are detected. In an embodiment of the present invention, a query may be sent periodically to the wireless network interface in the mobile device to gather information related to the mobile device. In an exemplary embodiment of the present invention, the mobile device may enter into sleep mode due to low power availability and wake up periodically to check whether it has any packets to receive or send. In another exemplary embodiment of the present invention, the mobile device may enter into scanning mode to search for new networks by scanning all the channels. In this condition, the mobile device may send or receive packets when scanning is completed. In another exemplary embodiment of the present invention, the mobile device may enter into roaming mode in which the mobile device may roam from coverage area of one access point to coverage area of another access point. VoIP data packet transmission or reception may be interrupted during roaming. In yet another exemplary embodiment of the present invention, a query may be sent to the wireless network interface in the mobile device for detecting loss of connectivity of the mobile device with the selected wireless network. In this condition, the mobile device may not be able to send or receive packets to or from selected wireless network. In various embodiments of the present invention, the new VoIP call streamed over the selected wireless network is recorded. Once the call is over, recording is stopped and the gathered information is stored.

At step 416, buffering time of multimedia data packets is estimated based on gathered information. In an embodiment of the present invention, once the information related to wireless network and mobile device is gathered, buffering time is estimated. Buffering time is the predetermined time period for which multimedia data packets which are streamed to the mobile device over the selected wireless network, are to be delayed before playout. The buffering time is estimated based on the information related to condition of the selected wireless network and mobile device.

At step 420, multimedia data packets that are received are played out based on the estimated buffering time. In an embodiment of the present invention, multimedia data packets are received by the mobile device over the selected wireless network. The multimedia data packets are then buffered for a predetermined time period which is equal to the estimated buffering time before playing out.

In various embodiments of the present invention, the abovementioned wireless network and device conditions that contribute to delay variations in the transmission and reception of multimedia data packets may not exist. In such a case, buffering time is not estimated based on the information related to the wireless network and mobile device when any of the abovementioned conditions existed.

The present invention may be implemented in numerous ways including as a, method, or a computer program product such as a computer readable storage medium or a computer network wherein programming instructions are communicated from a remote location.

Various embodiments of the present invention, may be implemented via one or more computer systems. The computer system includes at least one processing unit and memory. The processing unit executes program instructions and may be a real or a virtual processor. The computer system is not intended to suggest any limitation as to scope of use or functionality of described embodiments. Typical examples of a computer system include a general-purpose computer, a programmed microprocessor, a micro-controller, a peripheral integrated circuit element, and other devices or arrangements of devices that are capable of implementing the steps that constitute the method of the present invention. In an embodiment of the present invention, the memory may store software for implementing various embodiments of the present invention.

The present invention may suitably be embodied as a computer program product for use with a computer system. The method described herein is typically implemented as a computer program product, comprising a set of program instructions which is executed by a computer system or similar device. The set of program instructions may be a series of computer readable codes stored on a tangible medium, such as a computer readable storage medium, for example, diskette, CD-ROM, ROM, or hard disk, or transmittable to a computer system, via a modem or other interface device, over either a tangible medium, including but not limited to optical or analogue communications lines. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A computer-implemented method for estimating buffering time of multimedia data packets received by a mobile device for efficient playout of multimedia applications by the receiving mobile device, the computer-implemented method comprising:

determining at the receiving mobile device, a Quality of Service (QoS) of each of a plurality of wireless networks, wherein the QoS corresponding to each of the plurality of wireless networks is determined by initiating multimedia calls from the receiving mobile device over each of the plurality of wireless networks and recording information related to said multimedia calls;

selecting, at the receiving mobile device, a wireless network for receiving a multimedia data stream, such that the determined QoS of the selected wireless network is highest among the plurality of wireless networks;

commencing receiving the multimedia data stream at the receiving mobile device over the selected wireless network by initiating a multimedia call from the receiving mobile device over the selected wireless network;

monitoring one or more conditions related to the selected wireless network and the mobile device, wherein the one or more conditions result in variation in delay of multimedia data packets within the multimedia data stream received at the mobile device;

gathering information related to the one or more conditions pertaining to the selected wireless network and the mobile device; and estimating buffering time of multimedia data packets based on the gathered information, wherein data packets corresponding to one or more multimedia applications that are received by the mobile device are buffered for a predetermined time period before playout, the predetermined time period corresponds to the estimated buffering time.

2. The computer-implemented method of claim 1, wherein the multimedia calls comprise at least one of: Voice Over Internet Protocol (VoIP) calls and video conferencing.

3. The computer-implemented method of claim 1, wherein selecting a wireless network from the plurality of wireless networks based on Quality of Service (QoS) of the plurality of wireless networks comprises:

placing multimedia calls over each of the plurality of wireless networks via wireless network interfaces in the mobile device that correspond to each of the plurality of wireless networks;

monitoring the multimedia calls placed over each of the plurality of wireless networks;

obtaining one or more information related to the multimedia calls placed over each of the plurality of wireless networks, wherein the one or more information comprises at least information related to quality of the multimedia calls placed over the plurality of wireless networks;

recording the obtained information and storing the recorded information in at least one of: memory within the mobile device, a central database in the operator's network, and in an external website; and selecting the wireless network from amongst the plurality of wireless networks using the recorded information, wherein the wireless network with highest QoS is selected.

4. The computer-implemented method of claim 3, wherein the one or more information further comprises at least one of: time and date information related to the multimedia calls placed and location information of the mobile device when the multimedia calls are placed.

5. The computer-implemented method of claim 3, wherein the quality information related to the multimedia calls is obtained by at least one of: calculating Mean Opinion Score (MOP) of ratings provided by multiple users on one or more parameters that deteriorate the quality of multimedia calls, and using Perceptual Speech Quality Measurement (PSQM) that provides measurement of speech intelligibility associated with the multimedia calls.

6. The computer-implemented method of claim 3, wherein the quality information related to the multimedia calls is obtained by monitoring data packets related to the multimedia calls and capturing information related to delay in the transmission and reception of the data packets.

7. The computer-implemented method of claim 1, wherein gathering information related to one or more conditions pertaining to the selected wireless network comprises determining the retransmission rate of the data packets over the selected wireless network by sending a query to a wireless network interface in the mobile device that corresponds to the selected wireless network and monitoring the response to the query.

8. The computer-implemented method of claim 1, wherein an estimate of buffering time of multimedia packets is based on obtained time interval information related to at least one of sleep mode, scan mode, and roaming mode of the mobile device.

9. The computer-implemented method of claim 1, wherein gathering information related to one or more conditions pertaining to the mobile device comprises sending a query to a wireless network interface in the mobile device and obtaining time interval information related to the period for which the mobile device is disconnected with the selected wireless network.

10. The computer-implemented method of claim 1, wherein gathering information related to one or more conditions pertaining to the mobile device and the selected wireless network comprises sending ping packets to an access point in the selected wireless network and processing the query response received from the access point.

11. The computer-implemented method of claim 1, wherein estimating buffering time of multimedia data packets based on the gathered information comprises:

processing information related to one or more conditions of the selected wireless network and the mobile device, wherein the information facilitates to determine the one or more conditions that result in variation in delay of transmission and reception of data packets related to the multimedia calls; and estimating a predetermined time period for buffering multimedia data packets received by the mobile device before playout based on the processed information.

12. The computer-implemented method of claim 1, wherein estimating a predetermined time period for buffering multimedia data packets received by the mobile device before playout comprises at least one of: determining a threshold in case of a retransmission condition of the selected wireless network, wherein the buffering time is increased if the retransmission rate exceeds the predetermined threshold and buffering time is reduced if the retransmission rate is below the predetermined threshold.

13. The computer-implemented method of claim 12 further comprising:

receiving the estimated buffering time; and playing multimedia data packets received by the mobile device after the estimated buffering time.

14. The computer-implemented method of claim 1, wherein estimating a predetermined time period for buffering multimedia data packets received by the mobile device before playout comprises at least one of: ascertaining the time interval for which the mobile device is in any of sleep, scan and roaming mode as the buffering time for data packets and ascertaining the time interval for which the mobile device is disconnected with the selected wireless network.

15. A system for estimating buffering time of multimedia data packets received by a mobile device for efficient playout of multimedia applications by the receiving mobile device, wherein the mobile device comprises multiple wireless network interfaces that facilitates the mobile device to communicate with a plurality of wireless networks, the system comprising:

a wireless network select module, within the receiving mobile device, in communication with a processor and configured to:

determine a Quality of Service (Qos) of each of the plurality of wireless networks, wherein the QoS corresponding to each of the plurality of wireless networks is determined by initiating multimedia calls from the receiving mobile device over each of the plurality of wireless networks and recording information related to said multimedia calls;

select a wireless network for receiving a multimedia data stream, such that the determined QoS of the selected wireless network is highest among the plurality of wireless networks; and a buffering module in communication with the processor and configured to estimate buffering time of multimedia data packets within the multimedia data stream received by the mobile device over the selected wireless network, where the estimation is performed based on information related to one or more conditions of the selected wireless network and the mobile device, the one or more conditions result in variation in delay of multimedia data packets streamed to the mobile device, wherein data packets corresponding to one or more multimedia applications that are received by the mobile device are buffered for a predetermined time period before playout, the predetermined time period corresponds to the estimated buffering time.

16. The system of claim 15, wherein the wireless network select module comprises:

a record module in communication with the processor and configured to record one or more information related to multimedia calls placed over the plurality of wireless networks, wherein the one or more information comprises at least information related to quality of the multimedia calls; and a decision module in communication with the processor and configured to facilitate selecting a wireless network with highest QoS based on the recorded information.

17. The system of claim 15, wherein the buffering module comprises a state observer module, the state observer module in communication with the processor and configured to gather time interval information related to one or more conditions of the selected wireless network and the mobile device.

18. The system of claim 17, wherein the buffering module comprises a buffering time estimating module, the buffering time estimating module in communication with the processor and configured to estimate buffering time of data packets related to multimedia data packets received over the selected wireless network based on the time interval information received from the state observer module.

19. The system of claim 18, wherein the buffering module comprises a playout module, the playout module in communication with the processor and configured to play multimedia data packets received over the selected wireless network after a predetermined time period, wherein the predetermined time period corresponds to the estimated buffering time received from the buffering time estimation module.

* * * * *